July 6, 1926.

E. W. DAVIS

LUBRICANT COMPRESSOR

Filed April 19, 1924

1,591,114

Inventor:
Ernest W. Davis
By Earl R. Pierce
Atty.

Patented July 6, 1926.

1,591,114

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed April 19, 1924. Serial No. 707,708.

My invention relates to improvements in lubricant compressors, and is particularly concerned with the provision of a novel type of lubricator to be used as a part of a lubricating system, comprising a plurality of fittings adapted to be secured to the various bearings of the mechanism to be lubricated, and a compressor comprising means for successively making sealed connection with the fittings, said other means for forcing lubricant into the fittings under high pressure.

One of the objects of my pressent invention is to provide a compressor of the character described which is particularly adapted to be used for forcing the heavy, plastic lubricant which is used, for lubricating the crank pins and other similar bearings of railway locomotives. This lubricant is of about the same consistency as hard laundry soap, and requires an excessively high pressure to force it into the bearings where it is used.

Another object of my invention is to provide a compressor of the character described, embodying a low pressure cylinder, chamber, or barrel for holding a supply of lubricant, and a high pressure cylinder communicating therewith, in combination with means for forcing the lubricant from the high pressure cylinder into a bearing to be lubricated.

A still further object is to provide a compressor such as described, in which a single handle or operating element is used, first, for displacing lubricant from the low pressure barrel or chamber, and, second, for displacing the lubricant from the high pressure cylinder.

Another object of my invention is to provide a compressor for lubricant comprising a low pressure barrel and a high pressure cylinder, and means actuated by the movement of a handle in one direction for priming or filling the high pressure cylinder from the low pressure cylinder, and actuated by the movement of the handle in the opposite direction to discharge the lubricant from the high pressure cylinder.

A still further object is to provide a compressor of the character described which is simple in construction, economical to manufacture, and easy to operate.

Other objects of my invention will appear from time to time as this description progresses, reference being had to the accompanying drawings, in which—

Figure 1:
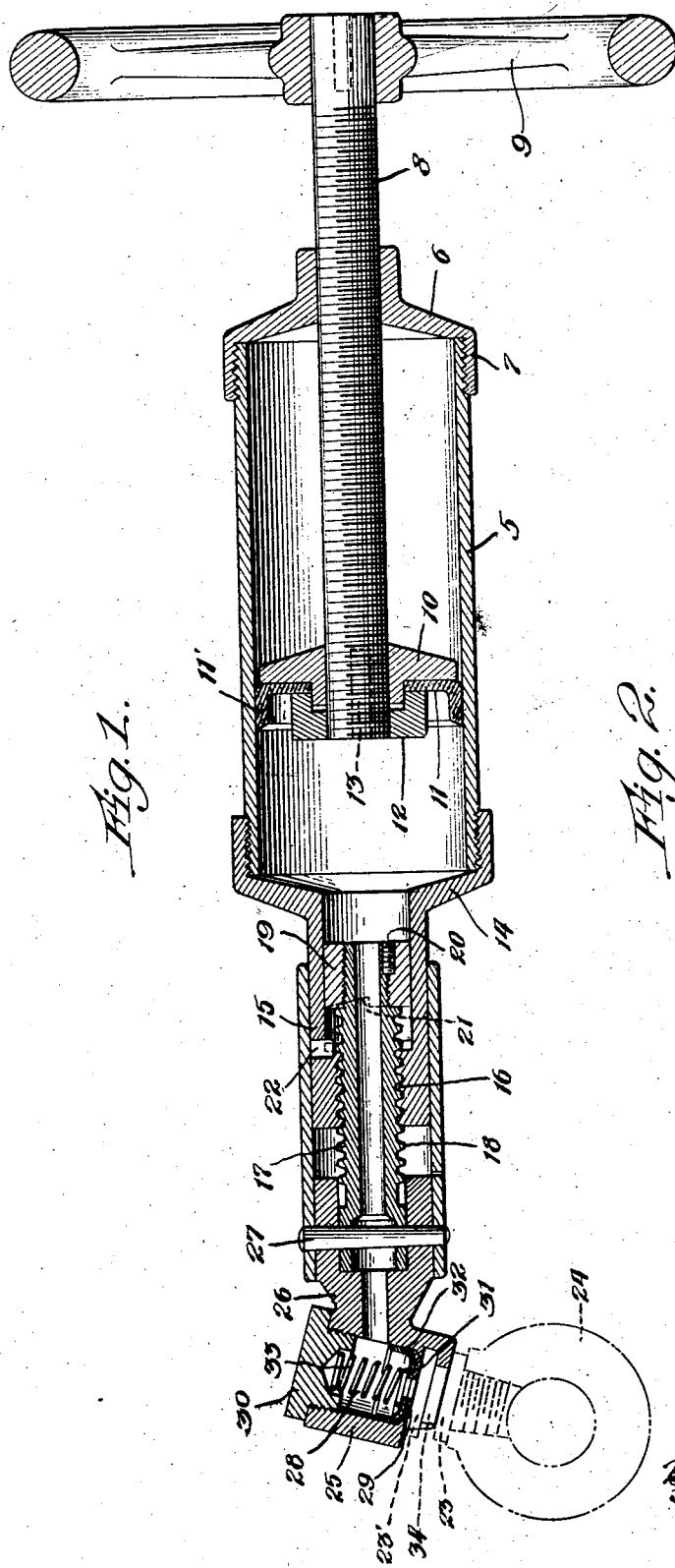
Figure 1 is a central longitudinal section through my improved compressor.
Figure 2:
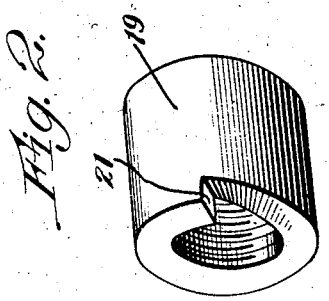
Figure 2 is a perspective view of one of the elements thereof.

Referring to the drawings, my improved compressor comprises the barrel 5 having the removable closure 6, which is secured to the barrel by means of a screw threaded connection 7, or in any other suitable manner. A piston rod 8 is threaded through the closure 6 and provided at its outer end with a suitable handle or hand wheel 9, by which it can be rotated. A plunger, comprising the follower plate 10, the cup leather or gasket 11, and the face plate 12, is rigidly secured to the inner end of the piston rod 8 and is prevented from rotating thereon by the key 13, or in any other suitable manner.

The end of the barrel opposite the closure 6 is provided with a second closure 14 which comprises the tubular extension 15, the bore of which, at the outer end thereof, is reduced in diameter and provided with the internal threads 16. I prefer to make the threads on the piston rod 8, and the corresponding threads on the closure 6, right handed threads, and the threads 16 left handed threads.

The tubular extension 15 forms a high pressure cylinder for receiving the inner end of the hollow plunger 17, which is provided with the external threads 18 for coacting with the internal threads 16 of the high pressure cylinder 15. Preferably the threads 16 and 18 are double threads and, as stated above, extend in a direction opposite to the threads of the piston rod 8. The inner end of the hollow plunger 17 is provided with an enlargement 19 which is here shown as being formed separately from the plunger 17 and threaded thereon. This enlargement is locked in place by means of the set screw 20 which forms a key between the threaded portion of the plunger and the enlargement 19.

To prevent any jamming of the threads 16 and 18 when the hollow plunger 17 is in its outermost position, I provide the shoulder 21 on the enlargement or collar 19, which is adapted to engage the pin 22 which extends through the wall of the tubular extension or high pressure cylinder 15, as shown in Figure 1.

The means which I have herein illustrated for establishing sealed connection between a fitting 23 secured to a bearing 24 and the compressor just described comprises the body member 25, having the tubular extension 26 which receives the outer end of the hollow plunger 17, and which is secured thereto by means of the pin 27. The body member 25 is provided with a transversely extending bore 28, one end of which is flanged over, as shown at 29, and the other end of which is closed by the screw threaded plug 30. A gasket 31 and a cup leather 32, which are yieldingly held against the flange 29 by means of the compression spring 33, provide means for establishing sealed contact with the head 23' of the fitting, and for preventing the escape of lubricant between the gasket 31 and the walls of the bore 28. A pair of flanges 34, formed integrally with the body member 25 and engaging beneath the head 23' of the fitting, provide means for mechanically securing the body member to the fitting.

The coupling member just described is described in more detail and claimed in the copending application of Clayton L. Sonen, Serial No. 707,713, filed April 19, 1924.

It should, however, be thoroughly understood that the type of coupling illustrated and described herein is not essential to the proper operation of my improved compressor, and that any suitable type of coupling member, which is constructed to make sealed connection with a fitting and to provide an anchorage for the hollow plunger 17, may be employed.

In the operation of my improved compressor, after the coupling member just described is connected with a fitting 23, as shown in Figure 1, the operator turns the handle or hand wheel 9 in a clockwise direction, thereby effecting two different results; first, the high pressure cylinder or tubular extension 15 is moved in a direction away from the fitting 23 until the shoulder 21 contacts with the pin 22. This positions the enlargement 19 of the hollow plunger 17 at the outer end of the high pressure cylinder 15. Second, the plunger carried by the inner end of the piston rod 8 is advanced toward the high pressure cylinder, thereby forcing lubricant from the barrel 5 into the high pressure cylinder. These two operations may take place simultaneously, or one after the other, but in any event both functions will be produced. The operator continues to turn upon the handle 9 until the resistance to its turning movement increases to the point where it is no longer possible easily to turn the handle 9.

When this occurs, the lubricant in the barrel 5 and in the high pressure cylinder is under considerable pressure, and the flange 11' of the cup leather 11 is held in frictional contact with the wall of the barrel 5 by the pressure of the lubricant. The operator thereupon turns the handle 9 in the opposite direction. This movement of the handle 9 is communicated through the piston rod 8 and the frictional contact between the flange 11' and the barrel 5 to the high pressure cylinder 15, which moves forwardly toward the fitting 23. In this manner, the enlarged end of the hollow plunger 17 causes the lubricant to be displaced from the high pressure cylinder through the bore of the plunger 17 and the tubular extension 26, and through the coupling member into the fitting 23.

By repeating the operation described above, that is, first turning the handle 9 in a clockwise direction, and then turning it in a counterclockwise direction, the operator can force successive charges of lubricant from the high pressure cylinder into the fitting until sufficient lubricant has been supplied to the bearing with which the compressor is connected. By then rotating the handle 9 through a small arc in a clockwise direction, the operator can relieve the pressure on the lubricant in the barrel 5, thereby permitting the coupling member to be detached from the fitting 23 and connected with the next fitting 23.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricant compressor comprising a barrel having a removable closure at one end, a piston rod threaded through said closure, a piston rigidly secured to the inner end of said piston rod, said piston comprising a cup leather, the flange of which contacts with said barrel, a closure for the opposite end of said barrel, said last named closure having a tubular extension forming a high pressure cylinder communicating with said barrel and coaxial therewith, the outer end of said high pressure cylinder having internal threads extending in a direction opposite to those of said piston rod, a hollow plunger threaded into said tubular extension, the inner end of said plunger being reciprocable in said high pressure cylinder, and a coupling member carried by the outer end of said plunger.

2. A lubricant compressor comprising a barrel having a closure at one end, a piston rod threaded through said closure, a piston rigidly secured to the inner end of said piston rod, said piston comprising a cup leather, the flange of which contacts with said barrel, a high pressure cylinder communicating with said barrel and coaxial therewith, the outer end of said high pressure cylinder having internal threads extending in a direction opposite to those of said piston rod, a hollow plunger threaded into said tubular extension, the inner end of said plunger being reciprocable in said high pressure cylinder, and a coupling member carried by the outer end of said plunger.

3. A lubricant compressor comprising a barrel having a closure, a piston rod threaded through said closure, a piston rigidly secured to the inner end of said piston rod, said piston comprising an expansible member for contact with said barrel, a high pressure cylinder communicating with said barrel, the outer end of said high pressure cylinder having internal threads extending in a direction opposite to those of said piston rod, a hollow plunger threaded into said tubular extension, a portion of said plunger being reciprocable in said high pressure cylinder, and a coupling member carried by the outer end of said plunger.

4. A lubricant compressor comprising a barrel, a piston reciprocable in said barrel, said piston comprising a portion expansible into contact with said barrel, a threaded piston rod rigidly connected with said piston, a high pressure cylinder communicating with said barrel, a hollow plunger reciprocable in said high pressure cylinder and having a threaded connection with said high pressure cylinder, the threads of said plunger extending in a direction opposite to the threads of said piston rod, and a coupling member rigidly secured to said plunger.

5. A lubricant compressor comprising a barrel, a piston reciprocable in said barrel, a threaded piston rod rigidly connected with said piston, a high pressure cylinder communicating with said barrel, a hollow plunger reciprocable in said high pressure cylinder and having a threaded connection with a portion of said compressor rigidly connected with said barrel, the threads of said plunger extending in a direction opposite to the threads of said piston rod, and a coupling member secured to said plunger.

6. A lubricant compressor comprising a barrel, a high pressure cylinder communicating with said barrel, a coupling member communicating with said barrel, a handle, means actuated by the rotation of said handle in one direction, for placing the lubricant in said barrel under low pressure, and other means, actuated by the rotation of said handle in the opposite direction, for placing the lubricant in said high pressure cylinder under increased pressure.

7. A lubricant compressor comprising a barrel, a coupling member communicating with said barrel, a handle, means, actuated by the rotation of said handle in one direction, for placing the lubricant in said barrel under low pressure, and other means, actuated by the rotation of said handle in the opposite direction, for placing the lubricant in said barrel under increased pressure.

8. A lubricant compressor comprising a container, rotary means driven by a twist in one direction for placing the contents of said container under pressure, and rotary means driven by a twist in the other direction for placing said contents under increased pressure.

9. A lubricant compressor comprising a container, rotary means driven by a twist in one direction for placing the contents of said container under pressure, rotary means driven by a twist in the other direction for placing said contents under increased pressure, and a single drive element for actuating both rotary means.

In witness whereof, I hereunto subscribe my name this 15th day of April, 1924.

ERNEST W. DAVIS.